United States Patent
Kito

[15] 3,661,429
[45] May 9, 1972

[54] PRESSURE CONTROL DEVICE FOR HYDRAULIC BRAKE SYSTEM OF POWERED VEHICLES

[72] Inventor: Masahiro Kito, Nagoya, Japan
[73] Assignee: Aisin Seiki Kabushiki Kaisha, Kariya Aichi Pref., Japan
[22] Filed: Aug. 11, 1970
[21] Appl. No.: 62,823

[30] Foreign Application Priority Data
Aug. 26, 1969 Japan.................................44/67412

[52] U.S. Cl. ............................................303/54, 303/10
[51] Int. Cl. ..........................................B60t 15/06
[58] Field of Search.....................303/6 A, 6 R, 10, 50, 54

[56] References Cited
UNITED STATES PATENTS

| | | |
|---|---|---|
| 2,420,313 | 5/1947 | Hall.........................................303/54 |
| 2,513,486 | 7/1950 | Herman...................................303/54 |
| 2,597,598 | 5/1952 | Robison...................................303/54 |
| 2,698,205 | 12/1954 | Gagen......................................303/54 |
| 3,284,143 | 11/1966 | Saftien....................................303/54 |

*Primary Examiner*—Duane A. Reger
*Attorney*—Pierce, Scheffler & Parker

[57] ABSTRACT

A pressure control device for hydraulic brake systems for use on powered vehicles wherein a pressure fluid passage from a powered pressure source such as an accumulator to the wheel cylinders is provided separately from a fluid passage through which the pressurized fluid is conveyed back from the wheel cylinders to a reservoir, so that the pressure fluid is circulated in the brake system without returning through the same fluid passage.

5 Claims, 1 Drawing Figure

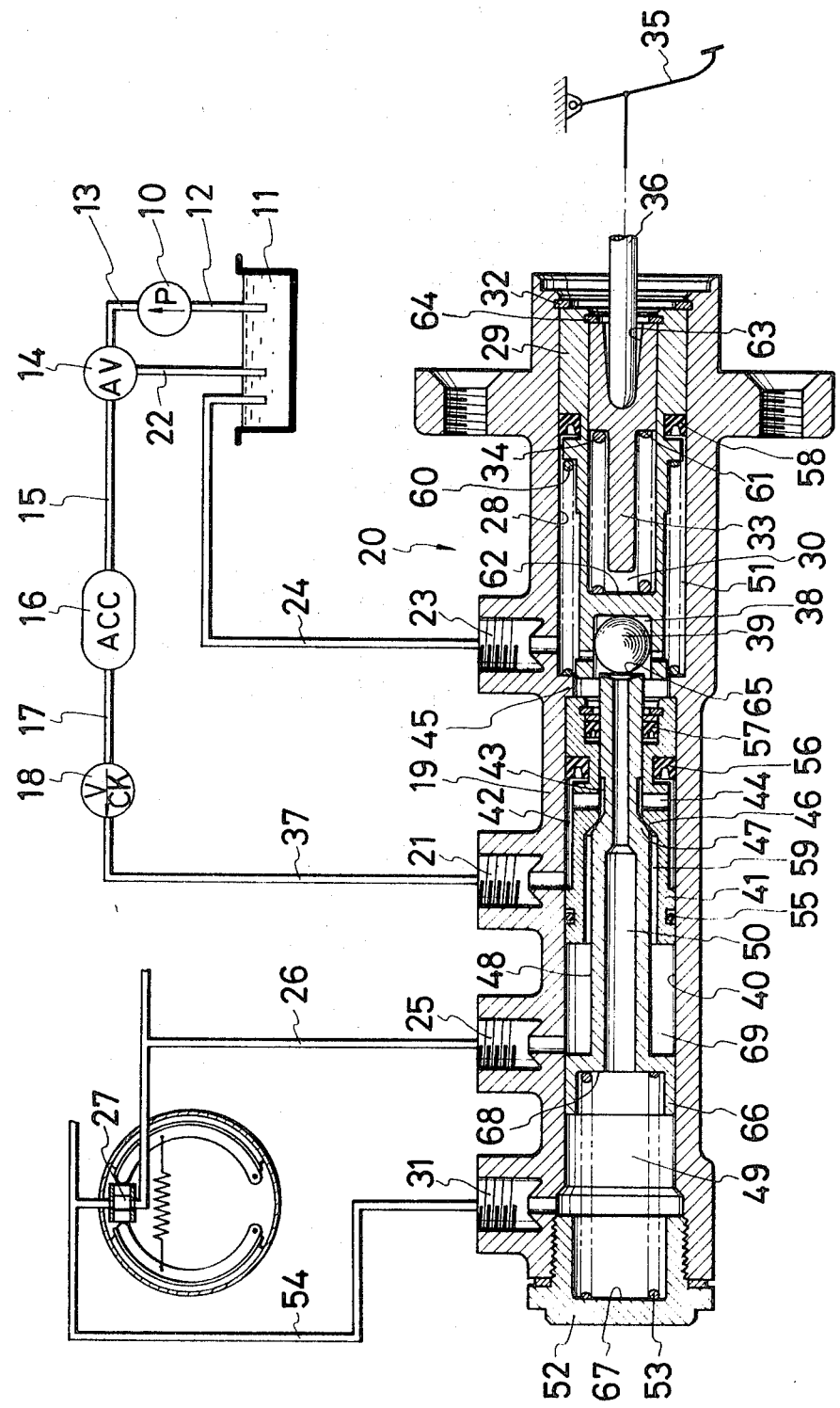

PRESSURE CONTROL DEVICE FOR HYDRAULIC BRAKE SYSTEM OF POWERED VEHICLES

This invention relates to pressure control devices for hydraulic brake system of powered vehicles.

Conventionally, upon the releasing of brakes in the powered vehicles the pressure fluid in the wheel cylinders is led back to the reservoir through the same brake pipe line through which said pressure fluid has been conveyed from the powered pressure source such as the accumulator to the wheel cylinders upon the application of brakes, so that it is often required to eliminate air from the brake system and the pressure fluid is subject to vapor lock due to braking heat.

Therefore, the principal object of the invention is to overcome the above drawbacks by providing an improved pressure control device in which the pressure fluid in the wheel cylinders is led back to the reservoir through piping which is provided separately from the piping through which the pressure fluid is conveyed to the wheel cylinders.

According to the present invention, the pressure control device comprises a first fluid passageway between the reservoir and wheel cylinders in which a first valve means is interposed and a second fluid passageway between the wheel cylinders and the reservoir in which a second valve means is interposed. When the brake is applied, the first valve means is opened to allow the pressure flow in the first passageway while the second valve means is closed to interrupt the fluid communication between the wheel cylinders and the reservoir, thereby accomplishing the braking operation. When the brake is released the first valve means is closed while the second valve means is opened, thereby allowing the pressure fluid to flow from the wheel cylinders to the reservoir through the second fluid passageway.

The invention is illustrated by the drawing which is a longitudinal axial section of the pressure control device in accordance with this invention wherein a pressure accumulator, its related hydraulic circuits and the like are additionally shown in a schematic way.

Referring to the drawing, the numeral 10 denotes an oil pump 10 adapted to be driven by an internal combustion engine (not shown) of the vehicle. One side of the pump 10 is connected through a suction pipe 12 with an oil reservoir 11 for sucking oil therefrom, while the other side of the pump 10 is connected through a delivery piping 13 to an accumulator charge valve 14 which is further connected through a further piping 15 to an accumulator 16 for the accumulation of oil pressure therein. The accumulator 16 is connected through a piping 17, a check valve 18 and a further piping 37 to a first inlet port 21 formed in a cylindrical housing 19 of a hydraulic pressure control valve assembly 20.

The charge valve 14 is fitted with a by-pass piping 22 and this by-pass arrangement is so designed and arranged that when a hydraulic pressure in excess of a certain predetermined value has been accumulated in the accumulator 16, the pressure fluid delivered from the pump 10 is then by-passed through piping 22 to the reservoir 11.

The valve housing 19 is formed with a compensation port 23 which is hydraulically connected through a piping 24 back to the reservoir 11. The housing 19 is further provided with a second inlet port 31 and an outlet port 25 which is connected through a piping 26 to wheel cylinders 27 (although only one wheel brake is shown in the drawing for simplicity) adapted for applying hydraulic braking force to vehicle wheels (not shown). The pressure fluid applied to the wheel cylinders 27 is led to the second inlet port 31 through a piping 54. It should be noted that both pipings 26 and 54 constantly communicated with each other in the wheel cylinders 27 thereby permitting circulation of the pressure fluid.

The construction of the hydraulic pressure control valve assembly 20 is as follows:

The valve housing 19 is formed longitudinally thereof with a multiple stepped cylindrical bore 28 which is open at its right-hand end in the drawing and receives slidably a valve holder 29 having a stepped cylindrical outside configuration. The outer or right-hand end of the valve carrier 29 abuts against a retainer snap spring 32. The piston-like valve carrier 29 is formed with a concentric and axially extending blind bore 30 in which a stepped piston-like motion transmitting member 33 is slidably mounted. This member 33 is formed with a circular shoulder 61, a compression coil spring 34 being inserted under pressure between the shoulder 61 and an end wall 62 of the bore 30.

At the outer or right-hand end of the motion transmitting member 33 is formed with an axial recess 63 for receiving the inner end of a push rod 36 which is mechanically linked with a conventional brake pedal 35. Rightward movement of the member 33 is limited by a retainer spring 64.

At the inner or left-hand end portion of the valve holder 29, an axially extending blind bore 38 is formed in which a valve ball 39 is turnably and axially movably received with a small lateral clearance.

An enlarged part 40 of the stepped bore 28 occupying substantially the left-hand half of the bore slidably receives a pressure piston 41 which is formed with axially extending bores 43 and 59 and a ring groove 42 on its outer peripheral surface. There is provided a lateral passage 44 which establishes a fluid communication between the bore 43 and the ring groove 42.

The piston 41 abuts at its inner right end against a circular shoulder 45 formed on the inside wall of the bore 28, thus the rightward stroke of the hydraulic pressure piston 41 is limited.

An axially bored, elongated valve member 48 is slidably received in the central bores 43 and 59. A valve seat 65 is formed at the inner right end of the valve member 48 and adapted for cooperation with the valve ball 39. An enlarged outer portion 66 of the valve member 48 is slidably engaged with the enlarged part 40 of the bore 28. There is constituted a brake applying chamber 69 between the outer portion 66 and the pressure piston 41, said chamber 69 being constantly in fluid communication with the central bore 59 and the wheel cylinders 27.

At an intermediate point between the outer portion 66 and the valve seat 65 of the valve member 48, a valve part 47 is formed on the outer peripheral surface of the valve member 48, so as to cooperate with a valve seat 46 formed centrally at the intermediate portion of the piston 41. The valve member 48 is formed with an axial bore 50, so as to provide a passible fluid communication between the otherwise two separated pressure oil chambers 49 and 51.

A hollow screw plug member 52 is screwed to the left-hand open end of the cylindrical housing 19. A compression coil spring 53 is inserted under pressure between an inside end wall 67 of the plug 52 and a shoulder at 68 of the outer portion 66 of the valve member 48.

When the brake is not applied, the valve part 47 contacts with the valve seat 46 by the exerting force of the compression spring 53. It should be noted that the hydraulic pressure of the accumulator 16 supplied to the central bore 43 is made ineffective against the valve member 48 since the pressure in the bore 43 is effective in both longitudinal directions.

Several sealing rings 55, 56, 57 and 58 are provided as shown for establishing effective seals at the respective positions.

A return spring 60 is provided under pressure between the piston 41 and valve carrier 29.

In operation, when the driver depresses the brake pedal 35, motion will be transmitted therefrom through the push rod 36 to the transmitting member 33, the latter being thereby moved leftwards and the valve holder 29 being shifted leftwards through the intermediary of spring 34. By this operation, the valve ball 39 is brought into sealing contact with valve seat 65, so as to interrupt fluid communication between the pressure chamber 49 and the reservoir 11. With further depression of the brake pedal 35, the valve piston 48 carrying the valve part 47 is moved further leftwards, whereby the latter is separated from its mating valve seat 46. Then, hydraulic pressure fluid will be conveyed from the accumulator 16 into the brake applying chamber 69 through the inlet port 21, the ring groove 42, the lateral passage 44, and the axially extending bores 43 and 59, then into the wheel cylinders 27 through the outlet port 25 and the piping 26 for performing a braking function as known per se.

It should be recognized that at this stage the hydraulic pressure applied to the cross-sectional area of the valve member 48 which resides at the right hand of the central bore 43 in the drawing develops in the reverse direction the reaction force to the brake pedal 35 through the valve member 48, the valve ball 39, the valve carrier 29, the coil spring 34, the motion transmitting member 33, and the push rod 36. In this way, the driver can sense physically the occasional braking effort in the form of the pedal reaction.

With the brake pedal 35 still further depressed, the inner end of the valve carrier 29 is brought into engagement with the piston 41. At this stage, the driver will sense a reaction in the form of the hydraulic pressure prevailing in the chamber 69 and acting upon the cross-sectional area of piston 41. Thus, the reaction force has been substantially increased from that of the foregoing stage. It will be seen that at this braking stage, the piston 41 acts as a kind of stopper means.

Now assuming that the hydraulic pressure source or accumulator 16 be inoperative if it is for any cause and a braking effort is applied to the brake pedal, the left-hand end of the member 29 will urge the piston 41 to move leftwards against the action of spring 53, whereby the hydraulic pressure in the chamber 69 is increased rapidly. Therefore, the related mechanism will act in the similar way to a conventional master cylinder.

When the brake pedal 35 is released, the hydraulic pressure within the pressure chambers 49 and 69 and the exerting force of the spring 53 having made the valve part 47 of the valve member 48 contact with the valve seat 46 thereby interrupting the fluid communication between the chamber 69 and the accumulator 16, the ball valve 39 separates from the valve seat 65 of the valve member 48 thereby reestablishing the fluid communication between the pressure chamber 49 and the reservoir 11.

Accordingly, the hydraulic pressure in the wheel cylinders 27 is led to the chamber 51 through the piping 54, the second inlet port 31, the pressure chamber 49, and the passage 50, then to the reservoir 11 through the compensation port 23 and the piping 24. It will be apparent that any air in the wheel cylinders 27 and the chambers 49 and 51 may be conveyed to the reservoir 11.

According to the features of this invention, the fluid pressure for braking is thoroughly circulated in the brake system without returning in the same circuit so that there is no need of air bleeding and there is no fear of vapor lock occurring due to heat.

In addition, the valve ball 39 can be brought into engagement with its valve seat 65 substantially freely and thus a precise centering of the axial bore 50 can be dispensed with. The same can be applied to the machining of several parts such as at 40, 43 and 66.

What I claim is:

1. A pressure control device comprising, a reservoir; a hydraulic fluid pressure source connected to said reservoir; wheel cylinders;
a control valve assembly comprising a cylinder housing;
said cylinder housing being provided with a first inlet port connected to said source through a first conduit,
a compensation port connected to said reservoir through a second conduit,
an outlet port connected to said wheel cylinders through a third conduit,
a second inlet port connected to said wheel cylinders through a fourth conduit,
said third conduit being constantly communicated with said fourth conduit through said wheel cylinders,
a first fluid passageway connecting said first inlet port to said outlet port,
a first valve means provided in said first fluid passageway and adapted for interrupting fluid communication between said first and third conduits when no brake is applied and for establishing fluid communication therebetween when brake is applied,
a second fluid passageway connecting said compensation port to said second inlet port,
a second valve means provided in said second fluid passageway and adapted for establishing fluid communication between said second and fourth conduits when no brake is applied and for interrupting fluid communication therebetween when brake is applied,
whereby a hydraulic pressure from said source is applied to said wheel cylinders through said first conduit, said first passageway, and said third conduit when the brake is applied, and then led to said reservoir from said wheel cylinders through said fourth conduit, said second passageway, and said second conduit when the brake is released.

2. The pressure control device as defined in claim 1, wherein said first valve means is formed by a piston mounted in said housing and being provided with an axial bore and a first valve seat therein, and a valve member slidably mounted in said axial bore and being provided with a first valve part to cooperate with said first valve seat.

3. The pressure control device as defined in claim 2, wherein said valve member is further provided with a second valve part at its one end and an axially central bore therein, and said second valve means is formed by said second valve part and a cooperating valve element mounted in said housing.

4. The pressure control device as defined in claim 3, wherein said cooperating valve element is a ball movably mounted in a valve carrier which is slidably fitted in said housing and operatively connected to a brake pedal.

5. The pressure control device as defined in claim 3, said valve member is provided with an enlarged outer portion slidably mounted in said housing to constitute a pressure chamber at each side thereof.

* * * * *

UNITED STATES PATENT OFFICE
CERTIFICATE OF CORRECTION

Patent No. 3,661,429      Dated May 9, 1972

Inventor(s) MASAHIRO KITO

It is certified that error appears in the above-identified patent and that said Letters Patent are hereby corrected as shown below:

The name of the assignee should be "AISIN"

not -- Aisia --

Signed and sealed this 3rd day of October 1972.

(SEAL)
Attest:

EDWARD M. FLETCHER, JR.             ROBERT GOTTSCHALK
Attesting Officer                   Commissioner of Patents